United States Patent
Pinera

(10) Patent No.: US 11,123,820 B2
(45) Date of Patent: Sep. 21, 2021

(54) PROCESS OF FORMING A METAL ADDITIVE MANUFACTURED PART WITH A SMOOTH SURFACE

(71) Applicant: Florida Turbine Technologies, Inc., Jupiter, FL (US)

(72) Inventor: Alex Pinera, Jupiter, FL (US)

(73) Assignee: Florida Turbine Technologies, Inc., Jupiter, FL (US)

(*) Notice: Subject to any disclaimer, the term of this patent is extended or adjusted under 35 U.S.C. 154(b) by 718 days.

(21) Appl. No.: 16/014,322

(22) Filed: Jun. 21, 2018

(65) Prior Publication Data

US 2019/0389005 A1  Dec. 26, 2019

(51) Int. Cl.
| | |
|---|---|
| *B22F 10/38* | (2021.01) |
| *B22F 10/64* | (2021.01) |
| *B22F 5/00* | (2006.01) |
| *B22F 3/24* | (2006.01) |
| *B23K 26/354* | (2014.01) |
| *B23K 26/34* | (2014.01) |
| *B33Y 40/00* | (2020.01) |
| *B33Y 10/00* | (2015.01) |
| *B22F 10/20* | (2021.01) |
| *B33Y 40/20* | (2020.01) |

(52) U.S. Cl.
CPC ............ *B23K 26/354* (2015.10); *B22F 5/009* (2013.01); *B22F 10/20* (2021.01); *B22F 10/38* (2021.01); *B22F 10/64* (2021.01); *B23K 26/34* (2013.01); *B33Y 10/00* (2014.12); *B33Y 40/00* (2014.12); *B33Y 40/20* (2020.01); *B22F 2003/248* (2013.01)

(58) Field of Classification Search
CPC ......... B33Y 10/00; B33Y 40/00; B33Y 40/20; B23K 26/34; B23K 26/342; B23K 26/352; B23K 26/354; B22F 3/24; B22F 2003/248; B22F 5/009; B22F 10/38; B22F 10/64
See application file for complete search history.

(56) References Cited

U.S. PATENT DOCUMENTS

| | | | |
|---|---|---|---|
| 2017/0203386 A1* | 7/2017 | Satoh | ................. B23K 15/0093 |
| 2019/0039134 A1* | 2/2019 | Vogel | ........................ B22F 5/04 |

* cited by examiner

*Primary Examiner* — Vanessa T. Luk
(74) *Attorney, Agent, or Firm* — Christopher & Weisberg, P.A.

(57) ABSTRACT

A process for forming a metal part from an additive manufacturing process with a smooth surface that includes the steps of printing the part using an AM process, heating the printed part to its solution heat treat or annealing temperature, placing the printed part in a fluidized salt bath for a short period of time to smooth a rough surface on the metal part, and then rapidly cool the heated metal part to prevent any change in grain structure. If the metal part is made from a metal material that oxidizes, then the metal part is treated in an enclosed chamber with Argon gas.

7 Claims, 2 Drawing Sheets

PROCESS OF FORMING A METAL ADDITIVE MANUFACTURED PART WITH A SMOOTH SURFACE

CROSS-REFERENCE TO RELATED APPLICATIONS

None.

GOVERNMENT LICENSE RIGHTS

None.

BACKGROUND OF THE INVENTION

Field of the Invention

The present invention relates generally to a metal additive manufactured part, and more specifically to a process for producing a smooth surface finish on a metal additive manufactured part such as a shrouded impeller.

Description of the Related Art Including Information Disclosed Under 37 CFR 1.97 and 1.98

Rough surface finish on metallic components can be very detrimental for performance, fatigue life, and general appearance. In gas turbine engines, for example, rough surface finish of flow path components can lead to significant efficiency losses. Metal additive manufacturing (AM) is increasingly being considered for use for parts with increasing complexity, strength, and performance requirements. The 3-dimensional layered construction, variations in powder bed heights across the bed, and other factors like the Marangoni effect due to surface tension gradients may cause marked surface roughness, which affects the resulting part performance. Additionally, AM processes allow designers to break free from traditional design constraints and optimize the part topology, leading to parts with less material and greater complexity. The wider adoption of AM may be limited by the surface finish being produced by the various AM techniques and the extent of post-processing required after fabrication. The ability to control the surface finish is a function of the AM technique used, the manufacturing process parameters, material, geometry of the part, direction the part is oriented during the build, and the post-processing techniques utilized.

BRIEF SUMMARY OF THE INVENTION

A process for producing a smooth surface finish on a metal part such as a shrouded impeller that has been produced using a metal additive manufacturing process. The printed metal part is heated up to around its Solution Heat Treat or annealing temperature, The metal part is placed in a fluidized salt bath that has been heated to around the metal part's incipient melt temperature to smooth the relatively rough surfaces, after around 10 seconds the metal part is removed from the fluidized salt bath, the metal part is then rapidly cooled to around 1,000 F in an inert gas using Argon to prevent any change in the grain structure, and the part is removed from the inert gas chamber. For vacuum melt alloys, such as Inconel or titanium, the part is cooled in a protective atmosphere. For air melt alloys, such as stainless steels the metal part can be cooled in air.

DETAILED DESCRIPTION OF THE INVENTION

The present invention is a process of forming a smooth surface on a metal part formed using the metal additive manufacturing (AM) process. The part can be a shrouded impeller for a gas turbine engine compressor or a pump for a liquid rocket engine. The AM process can be of the metal powder bed type in which the part is built up layer by layer by depositing layers of metal powder and melting the specific areas of the metal powder using a laser or electron beam. Once the metal part has been "printed", the surface finish will be too rough to use in specific machines such as a shrouded impeller for a compressor or a pump.

Figure 1:
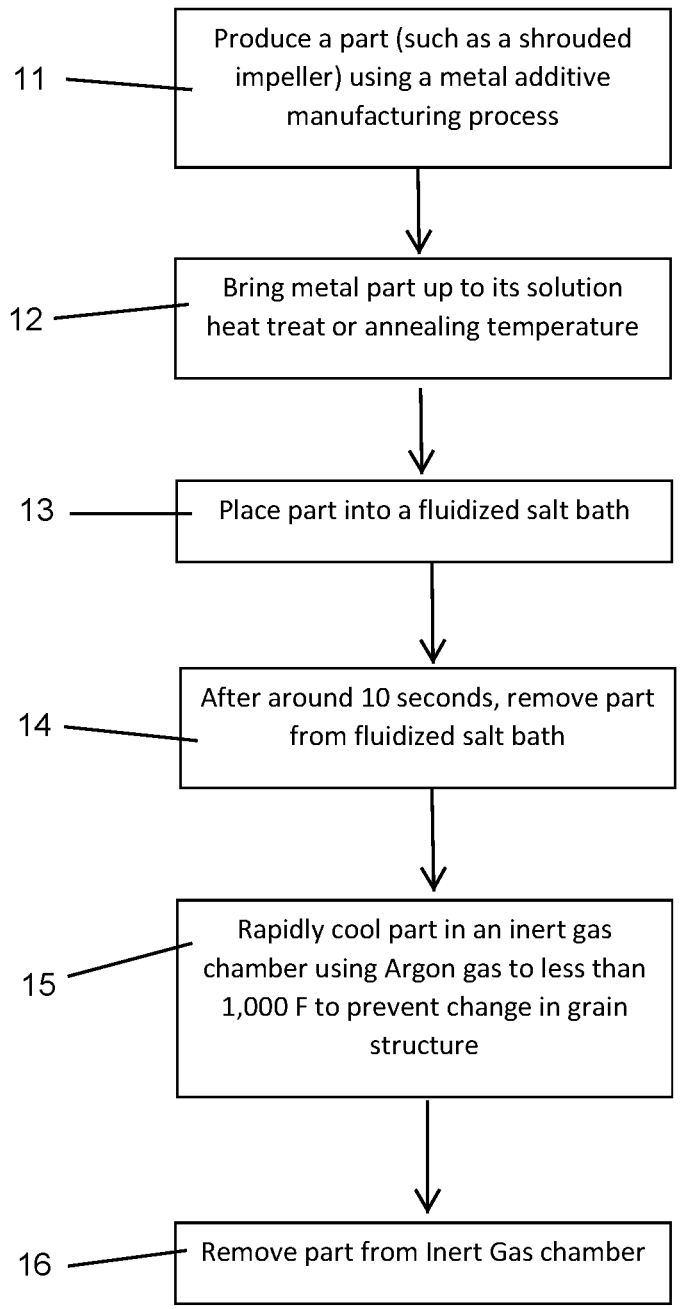
FIG. 1 shows a flow chart of the process for forming a smooth surface on a metal part produced using a metal additive manufacturing process according to the present invention.

The process for producing a metal part from additive manufacturing with a smooth surface is shown in the flow chart of FIG. 1. The metal part is produced using a metal additive manufacturing process (step 11) such as a metal powder bed using a laser to melt selected areas of the powder bed. One such part would be a shrouded impeller for a pump or a compressor. After the metal part has been "printed", the metal part having the rough surface finish is heated up to or near its Solution Heat Treat or annealing temperature (step 12). The metal part can be heated in an enclosed chamber. The heated metal part is then placed in a fluidized salt bath that has been heated to or just above the metal part's incipient melt temperature for a short period of time (step 13). The short period of time is around 10 seconds. After around 10 seconds, the metal part is removed from the fluidized salt bath (step 14).

Figure 2:
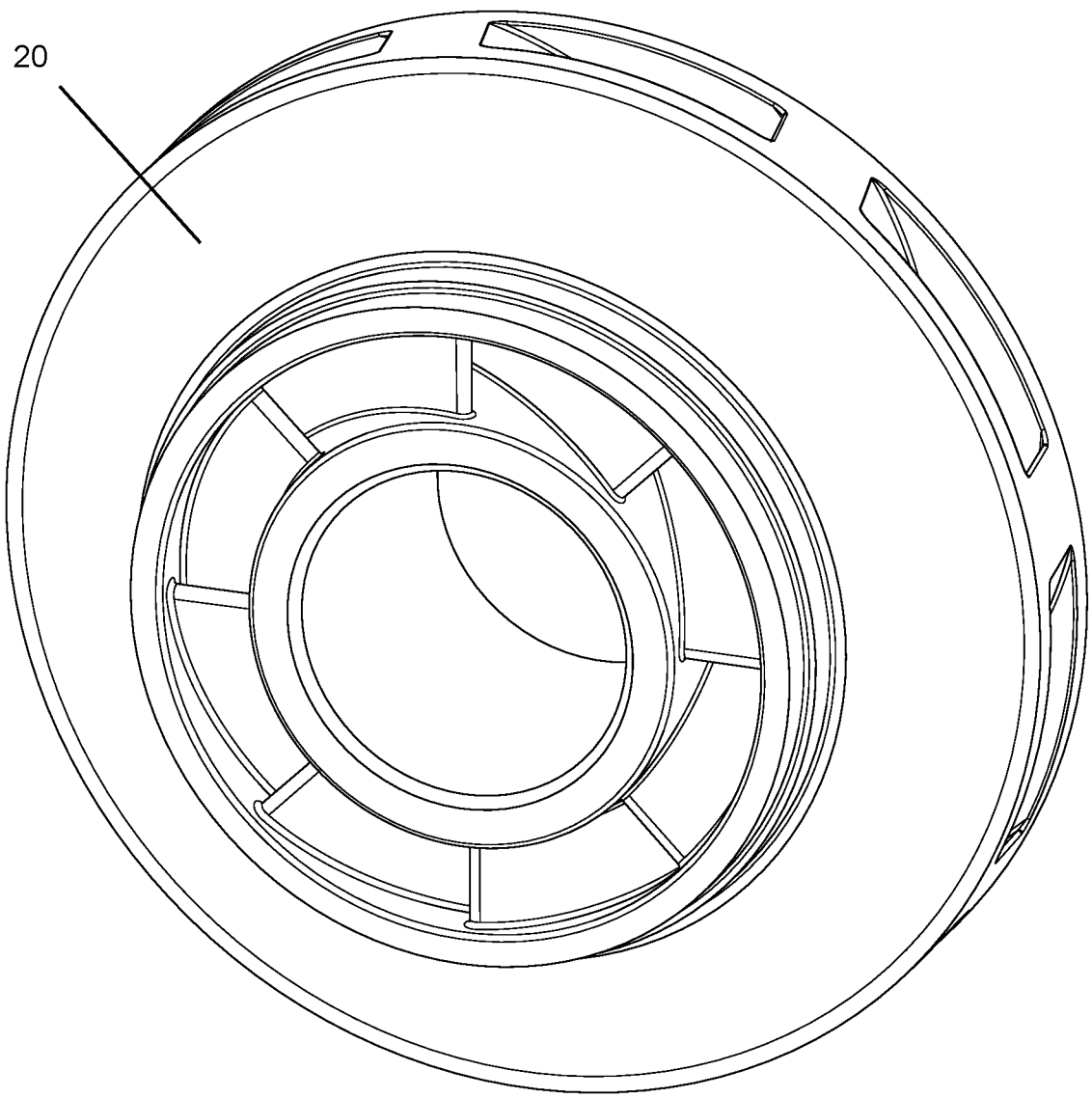
FIG. 2 shows a metal part such as a shrouded impeller that is produced using the process for smoothing the surface of the present invention.

After the metal part has been removed from the fluidized salt bath, the metal part is rapidly cooled to prevent a change in grain structure. If the metal part is made from a non-air-melted material, the metal part can be rapidly cooled in the chamber using a protective atmosphere, such as Argon gas. Otherwise the part can be processed in air. Similar to heat treat cycles, the metal part should be rapidly cooled to around 1,000 F to prevent adverse grain structure. For example, the metal part can be rapidly cooled in an inert gas chamber using Argon gas to less than 1,000 F to prevent change in grain structure (step 15). Once the metal part has cooled to around 1,000 F, the metal part can be removed from the chamber or left in the chamber and cooled to ambient temperature outside of an inert environment. For example, the metal part can be removed from the inert gas chamber (step 16). FIG. 2 shows a metal part 20 such as a shrouded impeller that is produced using the process for smoothing the surface of the prevent invention.

The invention claimed is:

1. A process for forming a metal part from an additive manufacturing process with a smooth surface finish comprising the steps of:
   producing a metal part using a metal additive manufacturing process;
   heat the additive manufactured part to its solution heat treat or annealing temperature;

place the heated metal part in to a fluidized salt bath that has been heated to around the metal part's incipient melt temperature to smooth a surface of the metal part;

after a short period of time, remove the metal part from the fluidized salt bath; and, rapidly cool the metal part to a temperature that would prevent a change in grain structure.

2. The process for forming a metal part from an additive manufacturing process of claim 1, and further comprising the step of:

the short period of time is around 10 seconds.

3. The process of forming a metal part from an additive manufacturing process of claim 1, and further comprising the step of:

rapidly cool the metal part to a temperature of around 1,000 degrees F.

4. The process for forming a metal part from an additive manufacturing process of claim 1, and further comprising the step of:

the metal additive manufacturing process is a metal powder bed using a laser to melt selected areas of the powder bed.

5. The process for forming a metal part from an additive manufacturing process of claim 1, and further comprising the step of:

if the metal part is formed from a material that oxidizes in air, then hold the metal part in an enclosed chamber with an inert gas.

6. The process for forming a metal part from an additive manufacturing process of claim 5, and further comprising the step of:

holding the metal part in the enclosed chamber using Argon gas.

7. The process for forming a metal part from an additive manufacturing process of claim 1, and further comprising the step of:

the metal part is a shrouded impeller.

\* \* \* \* \*